United States Patent [19]

Kahler

[11] Patent Number: 5,115,509

[45] Date of Patent: May 19, 1992

[54] SYSTEM FOR PREDETERMINING NUMERICAL VALUE AS A RESULT OF NON-LINEAR ACCUMULATION OF DETENT SIGNAL ROTATIONAL RATES OF A SELECTOR SWITCH WITH PREESTABLISHED SAMPLING TIME PERIODS

[75] Inventor: Jeffrey A. Kahler, Phoenix, Ariz.

[73] Assignee: Honeywell Inc., Minneapolis, Minn.

[21] Appl. No.: 310,823

[22] Filed: Feb. 14, 1989

[51] Int. Cl.[5] ............................ G06F 7/38; G06F 7/02
[52] U.S. Cl. ............................. 395/775; 364/DIG. 2;
364/157; 364/174; 364/178; 364/221.4;
364/258; 364/264.5; 364/565; 364/945.5;
364/921.9; 364/937.1; 364/934
[58] Field of Search ............ 364/200, 900, 157, 474.3,
364/474.35, 161, 162, 163, 174, 178, 181, 520,
554, 565, 705.05

[56] References Cited

U.S. PATENT DOCUMENTS

| | | | |
|---|---|---|---|
| 4,283,772 | 8/1981 | Johnston | 364/900 |
| 4,306,294 | 12/1981 | Hashimoto et al. | 364/705 |
| 4,510,427 | 4/1985 | Nozawa et al. | 318/590 |
| 4,516,202 | 5/1985 | Kodowaki | 364/200 |
| 4,577,271 | 3/1986 | Jones et al. | 364/174 |
| 4,602,326 | 7/1986 | Kraus | 364/158 |
| 4,646,225 | 2/1987 | Matsuura | 364/167 |
| 4,774,688 | 9/1988 | Kobayashi et al. | 364/900 |
| 4,958,289 | 9/1990 | Sum et al. | 364/431.01 |

*Primary Examiner*—Thomas C. Lee
*Assistant Examiner*—Krisna Lim
*Attorney, Agent, or Firm*—Dale E. Jepsen; D. J. Lenkszus; A. Medved

[57] ABSTRACT

The detent signals produced by the rotation of a selector switch knob are counted and stored in a first register, the contents of the register including a sign position designating the direction of rotation of the selector switch knob. The contents of the first register are periodically combined with the contents of a second register, permitting an operator to insert any desired numerical value in the second register. In order to expedite the insertion of a desired numerical value in the second register, when the rate of detent signal generation exceeds a preselected value, a numerical value, greater than the rate of detent signal generation, is combined with the contents of the second registr. Two algorithms are disclosed that permit the numerical value added to the second register to increase at a rate greater than the increase in detent signal generation. In this manner, a large numerical value can be entered in the second register without excessive rotation of the selector switch knob.

11 Claims, 3 Drawing Sheets

SYSTEM FOR PREDETERMINING NUMERICAL VALUE AS A RESULT OF NON-LINEAR ACCUMULATION OF DETENT SIGNAL ROTATIONAL RATES OF A SELECTOR SWITCH WITH PREESTABLISHED SAMPLING TIME PERIODS

BACKGROUND OF THE INVENTION

1. Field of the Invention

This invention relates generally to selection of a numerical value manually by means of a selector switch knob and associated apparatus and, more particularly, to a system that can accumulate values at rates greater than the rate of generation of detent signals, thereby expediting the manual selection of a numerical value.

2. Description of the Related Art

In many activities, a numerical value must be entered in a system to provide the information needed to direct the apparatus executing the activity. For example, a flight officer of an aircraft may wish to enter a direction in the flight control system for use by an automatic navigation system, the entered numerical value being compared with the actual flight direction to permit the automatic navigation system to make appropriate correction. The entry of the numerical value is typically performed by accumulating detent signals generated as a result of the rotation of a selector switch knob past preselected selector switch locations.

A common problem with the entry of the numerical data is that the accuracy of the numerical data, determined by the numerical value changed by an incremental rotation of the selector switch knob, can be so small when compared to the range of possible numerical values, that an unacceptable amount of time can be consumed in rotating a selector switch to accumulate a sufficient number of detent signals to reach a desired numerical value.

In the related art, the selector switch knob can be provided with two operational rotational positions, the pressure applied to the selector switch knob determining the current operational rotational position. One of the operational rotational positions is a course adjustment position, permitting a plurality of unit numerical values to be accumulated for each generated detent signal, while the second rotational position permits a single unit numerical value to be accumulated for each generated rotational position resulting from rotation of the selector switch position knob. The use of the selector switch with two operational rotational positions solves the problem of the rapid entering of numerical values. However, this functionality is provided by using a more complex selector switch and reduced flexibility.

A need has therefore been felt for a selector switch and associated apparatus that will permit the entering of a wide range of numerical values relative to the incremental numerical value without excessive rotation of the selector switch knob.

FEATURES OF THE INVENTION

It is an object of the present invention to provide an improved selector apparatus for entering a numerical value in a system.

It is a feature of the present invention to provide apparatus and technique for the rapid entry of a predetermined numerical value over a range of values large compared to an incremental numerical value.

It is another feature of the present invention to provide a predetermined numerical value by combining numerical values which are a function of a selector switch knob rotational velocity.

It is yet another feature of the present invention to provide for entry of a predetermined numerical value as a result of detent signals generated by a selector switch wherein the numerical value is changed by an amount proportional to a number of detent signals generated below a preselected rate of detent signal generation and by an amount proportional to the rate of generation of the detent signals above the preselected rate.

SUMMARY OF THE INVENTION

The aforementioned and other features are accomplished, according to the present invention, by providing apparatus for entering a predetermined value. The apparatus generates a numerical value proportional to detent signals generated by a selector switch knob rotation when the rate of generation of detent signals is below a predetermined value for generation of detent signals and generates a numerical value greater than the rate of detent signal generation when the rate of detent signal generation is above the predetermined value. The detent signals generated during preselected intervals are counted and the signal count is processed using an algorithm which generates a numerical value proportional to the detent signal rate below the predetermined rate of rotation of the selector switch knob and generates a progressively larger numerical value relative to the detent signal rate above the predetermined rate of rotation of the selector switch knob. The numerical values generated by the algorithm are combined with a value in an accumulator unit, the direction of rotation of the knob determining the sign of the generated numerical values. Two algorithms are disclosed that can be used with the present invention, the algorithms providing differing rates of increase for the generated numerical values as a function of selector switch knob rotation rate when the selector switch knob rotation rate is above the predetermined value.

These and other features of the invention will be understood upon reading of the following description along with the drawings.

DESCRIPTION OF THE PREFERRED EMBODIMENT

Detailed Description of the Figures

Figure 1:
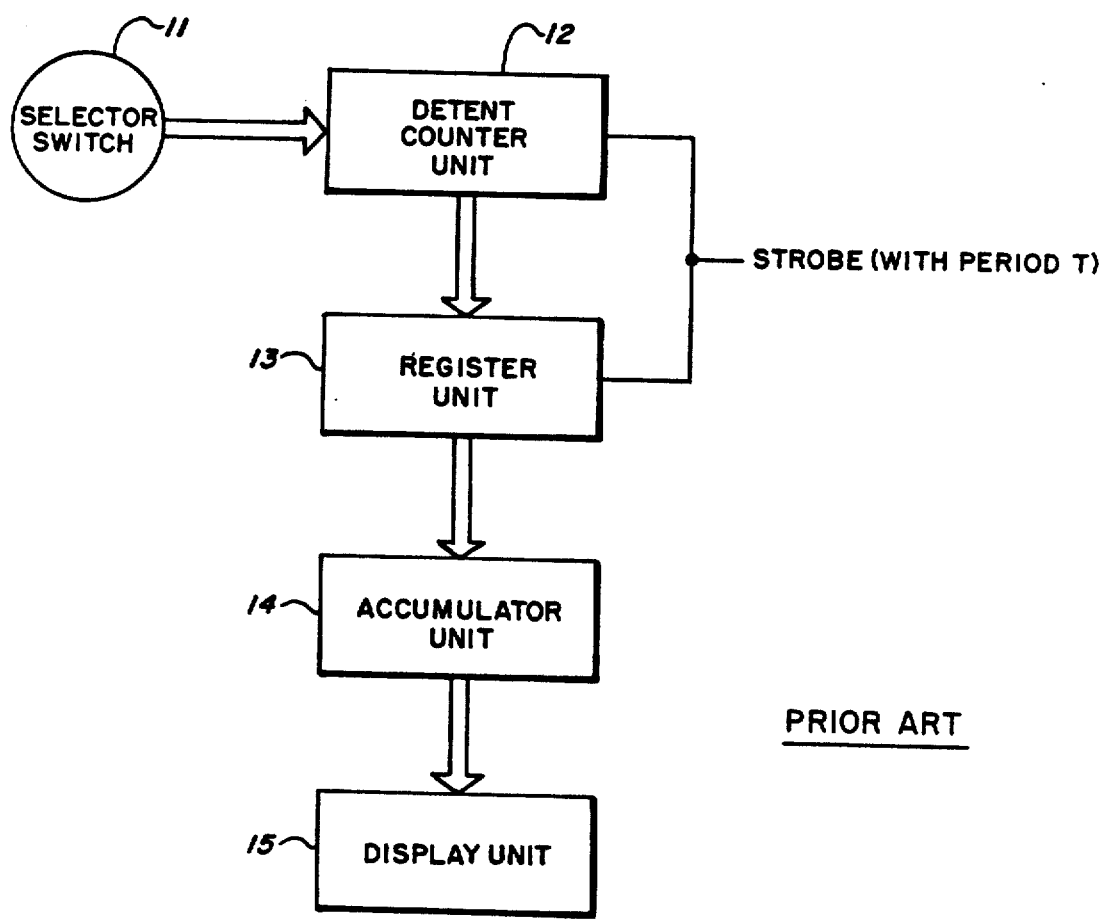
FIG. 1 illustrates the use of detent signals from a selector switch to provide a numerical value according to the prior art.

Referring now to FIG. 1, the apparatus for providing predetermined numerical value using detents from a selector switch according to the prior art is shown. The selector switch 11 has a knob that can be rotated. At certain specified rotational positions on the selector switch knob, detents (or signal pulses) are generated. The detents are applied to the detent counter unit 12. The detent counter unit 12 counts the number of detents applied thereto. After a selected period T, a strobe signal transfers the count in detent counter unit 12 to register unit 13. In addition, the strobe signal resets the detent counter unit to zero. Included in the signals transferred to the detent counter unit 12 is information relating the direction of rotation of the selector switch knob, the direction of rotation determining the sign of the count(s) entered in the register unit. The contents of the register unit 13 are combined with the contents of the accumulator unit 14 (in a manner determined by the sign associated with the register unit). The contents of the accumulator unit 14 is displayed on display unit 15 permitting the operator to enter the preselected numerical value. In the prior art, the accumulator unit 14 can receive either the contents of the register unit 13 or a multiple of the contents of register unit 13 depending on whether the selector switch knob of selector switch 11 is in the normal operational position or is in the second operational position, the second operational position being obtained by pressure applied to the knob. The position of the selector switch knob determines whether multiplier unit 13A multiplies the contents of register unit 13 by a predetermined factor or transfers the contents of the register unit 13 unchanged to the accumulator unit.

Figure 2:
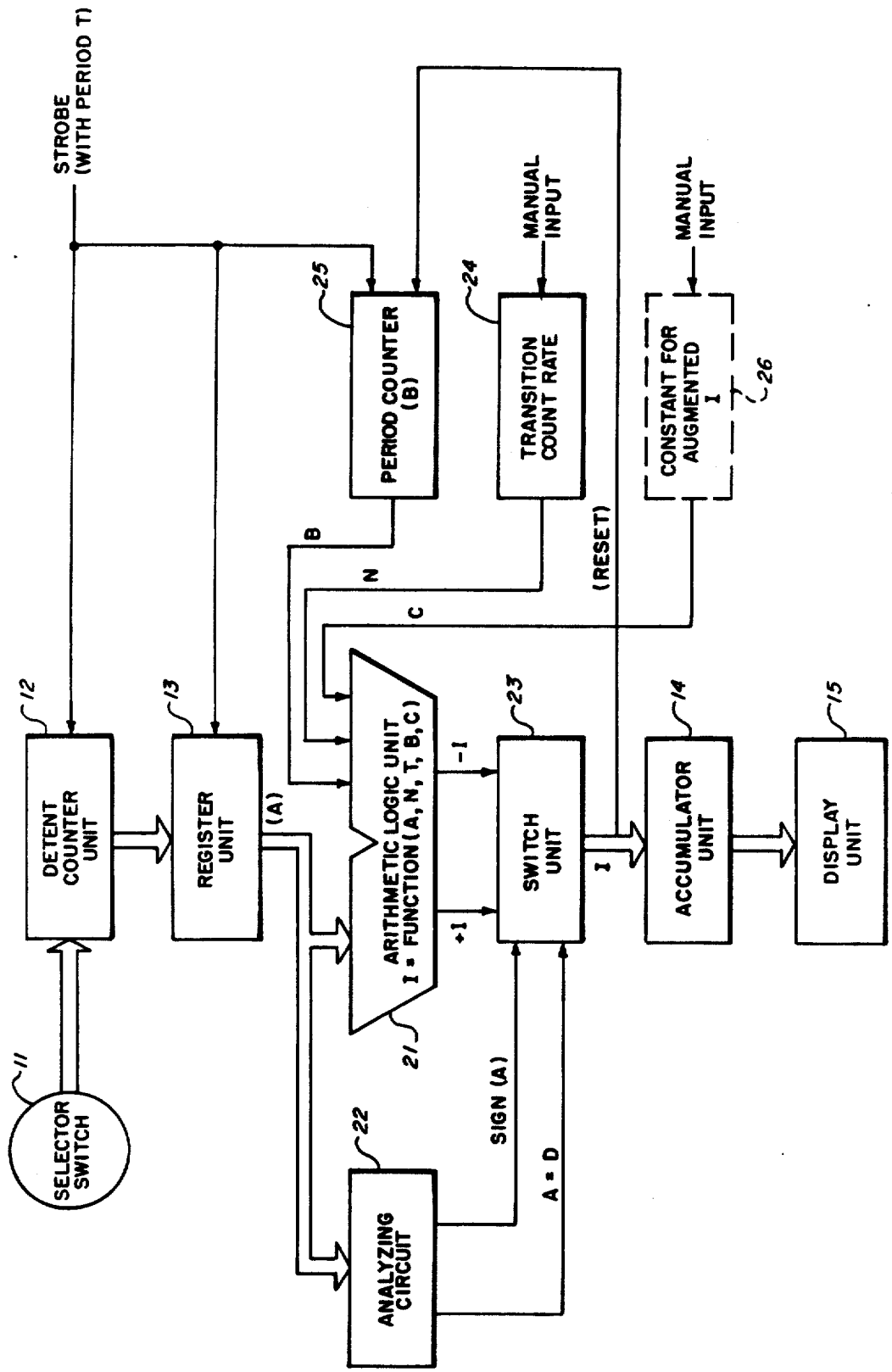
FIG. 2 illustrates the use of detent signals from a selector switch to provide a numerical value according to the present invention.

Referring next to FIG. 2, apparatus implementing the present invention is shown. The detent signals originating from the selector switch 11 are counted by detent counter unit 12. In response to a strobe signal, the contents of detent counter unit 12 are entered in register unit 13, the contents being designated as A. The value A includes the sign information. The contents of A ar applied to arithmetic logic unit 21 and analyzing circuit 22. Analyzing circuit 22 determines when A=0 and the sign of A from the contents of register unit 13. In addition to the contents A of register unit 13, the arithmetic logic unit receives a value B from period counter 25, a value N from register 24 and a value C from register 26. The arithmetic logic unit 21 determines a number I=-Function (A,C,N,T,B). The switch unit 23 applies no signal to the accumulator unit 14 when the switch unit 23 receives a signal from analyzing circuit 22 indicating that A=0. When A does not equal zero and when the analyzing circuit 22 applies a first SIGN(A) signal to the switch, indicating that the rotation of the knob is in the positive count direction, then the value of I is combined with the accumulator unit 14. When A does not equal zero and when the second value of the SIGN(A) indicates that the rotation of the knob of selector switch 11 is in the negative count direction, the −I is added to the accumulator unit 14. The display unit 15 is used by the operator to determine when the predetermined value has been entered in the accumulator unit 14. Each time a strobe signal is generated, a count is stored in period counter 25. The contents of B are cleared (i.e., in response to a reset signal, for example, from the switch unit 23) each time that the contents of register unit 13 are applied to accumulator unit 14. Thus, the quantity B is the number of periods (T) since the last detent was transferred to the detent counter unit. The number N is used to determine the number of detents per second that divides an addition to the accumulator unit that is proportional to the detent signal rate from an augmented addition to the accumulator unit per detent signal rate. The value C is manually set and determines an exponential augmentation to the accumulator unit per detent signal rate.

Figure 3:
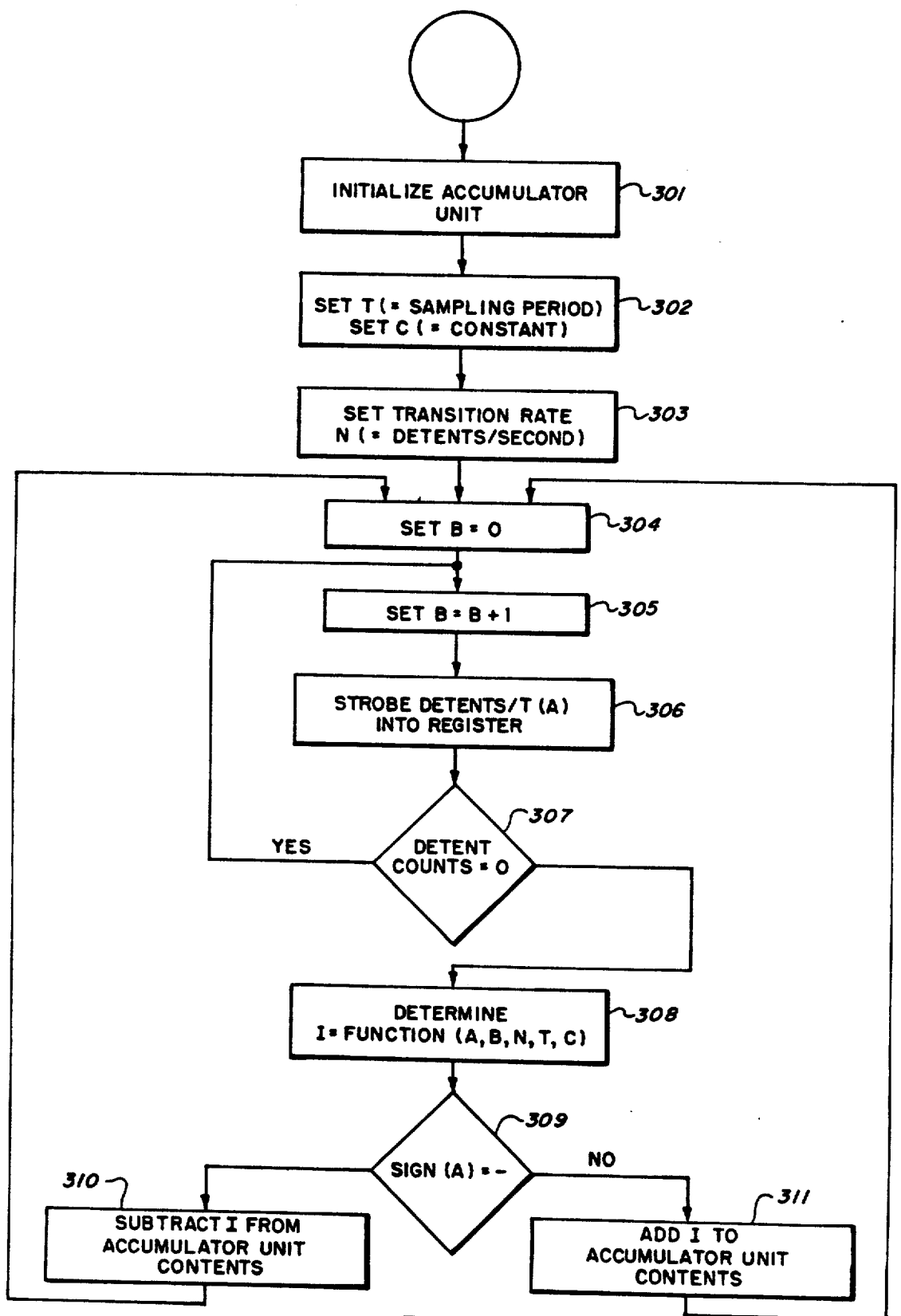
FIG. 3 is a flow diagram illustrating the operation of providing a numerical value using detent signals from a selector switch according to the present invention.

In FIG. 3, the process for implementing the present invention is illustrated. In step 301, the accumulator unit is initialized. The sampling period T (i.e., the period between strobe signals) and the constant C are selected in step 302. The number N, the number of detents per second that separate a linear addition to the accumulator unit and an augmented addition to the accumulator unit for each detent, is selected in step 303. In step 304, B is set equal to the maximum count possible, B being the number of periods since the last detent signal (i.e., the number of times since the accumulator unit was incremented). In step 305, the value of B is incremented by 1. The number of detents A occurring in a sampling period T are identified (i.e., the contents of the detent counter unit 12 are transferred to the register 13 in FIG. 2) in step 306. In step 307, a determination is made whether the number of detent signals, A, is zero. When A=0, no change in the accumulator unit is made and the process continues by incrementing the value of B by one unit in step 305. When A does not equal zero in step 307, then the value I=FUNCTION(A,B,N,T,C) is determined in step 308. In step 309, the sign of A is determined and when the sign of A is positive, then I is added to the numerical value in the accumulator unit. In step 312, the value of B is set equal to zero and the process continued in step 305. When, in step 309, the sign of A is negative, then I is subtracted from the contents of the accumulator unit. In step 312, the value of B is set equal to zero and the procedure is continued in step 305.

Operation of the Preferred Embodiment

The present invention provides for the rapid entry of a numerical value into an accumulator unit by having the numerical values entered into the accumulator unit. When the rate of rotation of the selector switch is in a first range of values, the numerical values combined with the numerical value in the accumulator unit are equal to the detents generated by the selector switch. When the rate of rotation of the selector switch is in a second range of values, the numerical values combined with the numerical value in the accumulator unit are greater than the detent signals generated by the selector switch. In this manner, rapid rotation of the selector switch knob permits an accumulation of numerical values as a function of the rate of detent signal generation rather than proportional to the actual number of detent signals being produced, while slow rotation of the selector switch permits the numerical values accumulated in the accumulator unit to be proportional at least to the detent signals produced by the selector switch. The rapid rotation provides a coarse selection of numerical values entered in the accumulation unit while a slow rotation of the selector switch knob permits a precise selection of the numerical values to be entered in the accumulation unit. In this manner, a preselected value can be entered in the accumulator unit rapidly despite the large range of possible predetermined numerical values compared to the numerical value increment.

In the preferred embodiment, the function for providing numerical values to be accumulated in an accumulator unit that is proportional to the detent signals generated for a first rate of rotation values and augmented numerical values to be accumulated in the accumulator unit for a second set of rotation values is given by:

$$I = \text{INTEGER}[(A^2)/(N*B*T)] + 1 \qquad \text{Equation (1)}$$

where;

INTEGER[X] is a function that discards any fractional value of X,

T is a sampling time period,

A is the number of detent signals during the previous time period T,

N is the number of detent signals/second that provides the maximum rotation rate at which each detent signal results in a single increment in the accumulator unit, and B is the number of time periods T since the most recent entry in the accumulator unit. The generation of a detent signal then means that the detent signal generation rate is $1/(B*T)$.

Equation (1) and the invention can be understood by considering four ranges for detent signal generation. In the first case, the selector switch knob is not being rotated and $A = 0$. For the situation where no detent signals are being generated, the algorithm is not used and a separate algorithm or apparatus (such as analyzing circuit 22) detects the lack of signal generation during a time period and determines that the numerical value in the accumulator unit 14 is not changed.

In the second situation, the rotation of the knob provides a signal generation at a rate lower than N detent signals/second and $B > 1$. For Equation (1), one detent signal is generated during the sampling period T or $A = A^2 = 1$. By definition, $N > 1/(B*T)$ or $1 > 1/(N*B*T)$. Therefore, $I = INTEGER(<1) + 1 = 1$. A unit change is therefore made in the accumulator unit 14 for this rate of detent signal generation.

The third situation, the rate of detent signal generation is greater than N, however, $B > 1$. $N < 1/(B*T)$ or $1 < 1/(N*B*T)$. Therefore, $I = INTEGER(>1) + 1 \leq 2$, a value that will increase as B decreases.

The fourth situation involves the situation where at least one detent signal is generated for each sampling period T. Equation (1) can be understood as follows. With a detent signal being generated each sample period, $B = 1$. The speed of rotation (i.e., proportional to the rate of detent signal generation) is $A/T$. Therefore, by multiplying a number proportional to the rate of detent signal generation by A, Equation (1) provides a linear increase in the numerical values combined in the accumulator unit as a function of detent signal rate generation, i.e., increases as $A^2/(N*T)$.

When a more rapid accumulation of numerical values is required, then the following equation is used:

$$I = C^{INTEGER[ABS(A)/(N*B*T)]}$$ Equation (2)

where;

N, B, T, INTEGER and A have the previous definitions,

ABS(X) is the absolute value of X, and

C is a constant controlling the rate of exponential increase in numerical values combined in the accumulator unit. In this Equation, A rather than $A^2$ is used to prevent saturation of the numerical values resulting from increases in A. Equation (2), as with Equation (1), provides a single increment for the accumulator unit for each generated detent signal when the signal generation rate is less than N detent signals/second. and provides an increasing incremental numerical value to be combined with the numerical value in the accumulator unit with rate of detent signal generation in a time period T.

The value of N is typically selected by experiment to provide an operator with a satisfactory "feel" for the selector switch. For example, the rate of detent signal generation N at which the transition occurs is selected to be 6 detent signals/second. The sampling period T is chosen to prevent saturation of the registers. The registers in the preferred embodiment can store $+7/-8$ counts and the value of T is chosen as 16 milliseconds.

It will be clear to those skilled in the art that, although the present invention has been described in terms of apparatus, a software procedure can be used to implement the process shown in FIG. 3. For example, the accumulator unit can be implemented using a storage location and a procedure for combining the contents of the storage location with a recently generated numerical value I.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

I claim:

1. Apparatus for selecting a predetermined numerical value, said apparatus comprising:

selector switch means for providing detent signals determined by an amount of rotation of a selector switch knob;

sampling means coupled to said selector switch means for determining a selector switch means detent signal count during each of a sequence of time periods having preestablished length;

arithmetic logic means, coupled to said sampling means, for generating an input signal in response to said detent signal count, said arithmetic logic means providing an input signal equal to said detent signal count when a rate of generation of said detent signal counts is less than a preselected value, said input signal being greater than said detent signal count when a rate of generation of said detent signal count is greater than said preselected value; accumulator means, coupled to said arithmetic logic means, for combining a stored numerical value with said input signal, wherein said stored numerical value represents the accumulation of input signals which were previously input to said accumulator means from said arithmetic logic means; and, wherein; said arithmetic logic means implements an algorithm of $I = INTEGER\ [(A^2)/(N*B*T)] + 1$ and wherein INTEGER [X] is a function that discards any fractional value of X; T is said preestablished length of a sampling time period; A is said detent signal count; N is said preselected value of said detent signals per second that provides the maximum rotational rate and B is the number of time periods T since the most recent entry in said accumulator unit.

2. The selection apparatus of claim 1 wherein said input signal is proportional to said rate of generation of said detent signal counts when said rate of generation of said detent signal counts is greater than said preselected value.

3. The selection apparatus of claim 1 further comprising detection means, coupled to said sampling means and to said arithmetic logic means, said detection means determining when said detent signal count is zero and preventing said input signal from being applied to said accumulator means when said detent signal count is zero.

4. The selection apparatus of claim 3 wherein an input signal is applied to said accumulator unit each of said sequence of time periods.

5. The selection apparatus of claim 4 wherein said preselected value is less than said one detent signal per sampling period.

6. The selection apparatus of claim 4, wherein said arithmetic means also implements an algorithm of $I = -C^{INTEGER[ABS(A)/(N*B*T)]}$; wherein INTEGER[X] is a function that discards any fractional value of X; T is said preestablished length of a sampling time period; A is said detent signal count; N is said preselected value of said detent signals per second that provides the maximum rotational rate, and B is the number of time periods T since the most recent entry in said accumulator unit; ABS(X) is the absolute value of X and C is a constant controlling the rate of increase in numerical values combined in said accumulator unit.

7. The selection apparatus of claim 6 wherein said preselected value is less than one detent signal per said sampling time period.

8. A device for entering a predetermined numerical value by an operator, said device comprising:
    a selector switch for generating detent signals in response to a rotation of a selector switch knob by said operator;
    sampling means, coupled to said selector switch, for determining a detent signal count during each of a sequence of time periods, each of said time periods having a preestablished length;
    arithmetic logic means for computing an intermediate numerical value as a function of said detent signal count, said arithmetic logic means using an algorithm changing a stored numerical value at a rate generally equal to a generation rate of said detent signals when said generation rate is less than a preselected value, said algorithm changing said stored numerical value at a rate greater than said generation rate of said detent signals when said generation rate is greater than said preselected value; accumulator means for combining in said accumulator means said stored numerical value with said intermediate numerical value from said arithmetic logic means and storing a resulting numerical value in said accumulator means in place of said stored numerical value; and,
    wherein; said algorithm being $I = INTEGER[(A^2)/(N*B*T)] + 1$ and wherein INTEGER [X] is a function that discards any fractional value of X; T is said preestablished length of a sampling time period; A is said detent signal count; N is said preselected value of said detent signals per second that provides the maximum rotational rate, and B is the number of time periods T since the most recent entry in said accumulator unit.

9. The numerical value entering device of claim 8 wherein said stored numerical value is combined with said intermediate numerical value during each interval of said sequence of time periods.

10. A numerical value entering device of claim 9 further including switch means for preventing a change in said stored numerical value when said signal count is zero during one of said sequence of time periods.

11. The selection apparatus of claim 10, said algorithm also being $I = C^{INTEGER[ABS(A)/(N*B*T)]}$; wherein A is said detent signal count; INTEGER[X] is a function that discards any fractional value of X; T is said preestablished length of a sampling time period; N is said preselected value of said detent signals per second that provides the maximum rotational rate; B is the number of time periods T since the most recent entry in the accumulator unit; ABS(X) is an absolute value of X, and C is a constant controlling the rate of change in numerical values combined in said accumulator unit.

* * * * *